J. P. Manny,
Harvester Cutter.
No. 20,808.
Patented July 6, 1858.
2 Sheets Sheet 1.
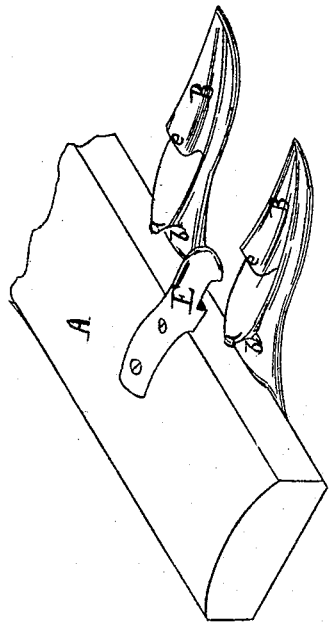
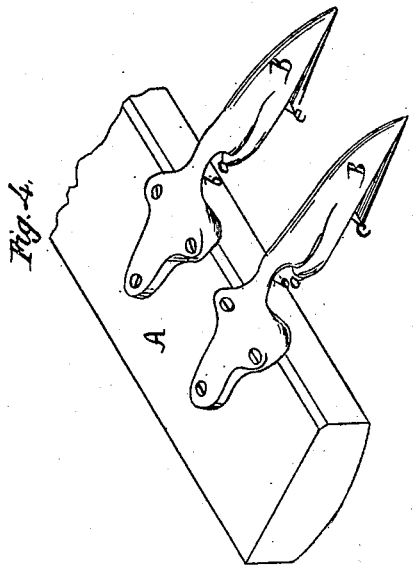
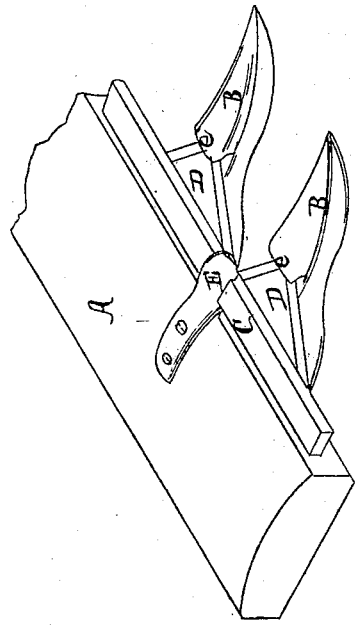
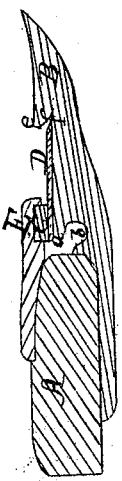

J. P. Manny,
Harvester Cutter.

No. 20,808.

Patented July 6, 1858.

UNITED STATES PATENT OFFICE.

J. P. MANNY, OF ROCKFORD, ILLINOIS.

IMPROVEMENT IN HARVESTER-FINGERS.

Specification forming part of Letters Patent No. 20,808, dated July 6, 1858.

*To all whom it may concern:*

Be it known that I, JOHN P. MANNY, of Rockford, in the county of Winnebago and State of Illinois, have invented certain new and useful Improvements in the Cutting Apparatus of Harvesters; and I do hereby declare that the following is a full, clear, and exact description of the construction and operation of the same, reference being had to the accompanying drawings, in which—

Figure 1 represents a perspective view of a part of said cutting apparatus. Fig. 2 represents a perspective view of the guard-fingers and finger-bar. Fig. 3 represents a vertical cross-section through the guard-finger. Fig. 4 represents a perspective view of the guard-fingers and finger-bar seen from below. Figs. 5, 6, 7, and 8 represent similar views, respectively, of a modified cutting apparatus embracing the same principles as the first one.

The nature of my invention relates to certain improvements in the shape of the guard-fingers and cutters that are intended to prevent the lodging of gummy matter between the cutters and guard-fingers.

To enable others skilled in the art to make and use my invention, I will proceed to describe its construction and operation.

A represents the finger-bar, to which the guard-fingers B are secured by means of screws or screw-bolts.

C represents the sickle-bar, and D the cutters secured to the sickle-bar.

E is a guide for holding the cutter down on the faces of the guard-fingers. The face of the guard-finger is made tapering backward from the front edge of the sickle-bar and cones to a point, $a$, over the cavity $b$, and even with the rear edge of the sickle-bar.

It is a well known fact that it is impossible to prevent fine wet leaves and gummy matter from getting under the cutter by the shape of the guard-finger above described. Such gummy matter as should get between the cutter and the guard-finger is prevented from lodging therein as by the rearward tapering form of the guard on one side, and by the shape of the cutters it is worked to the rearward and into the cavity $b$, where it is operated by the stubble below and the cutter-bar and the butts of the falling grain above, which together keep it entirely clear.

Figure 6:
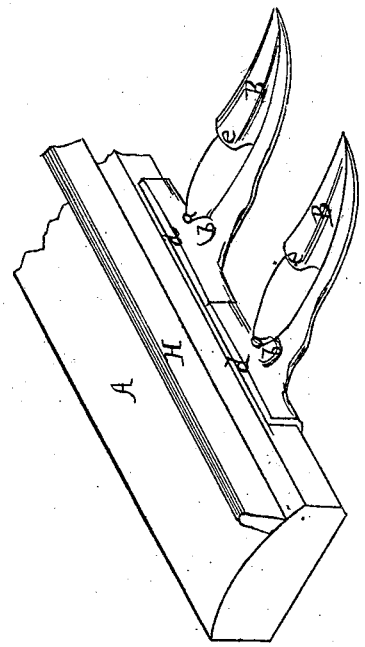
Figure 8:
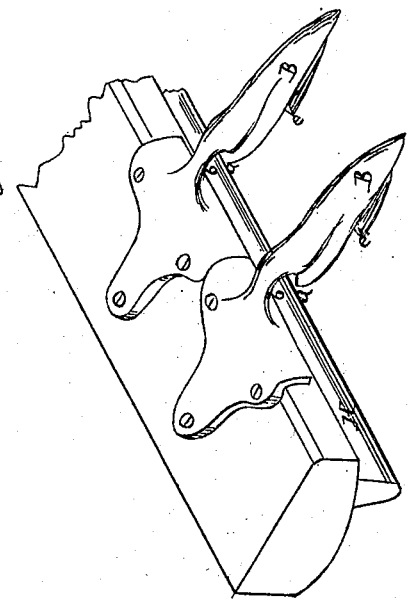
Figure 5:
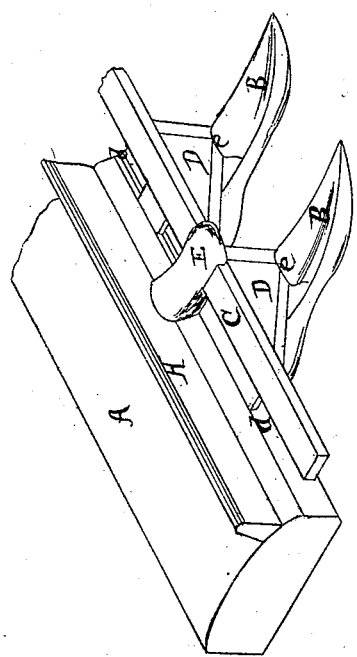
Figure 7:

I sometimes so shape the guard-fingers that the plates by which they are secured to the lower side of the finger-bar shall touch one another, as represented in Fig. 8. These plates, which pass around to the front edge of the finger-bar, terminate in an edge, $d$, and thus form a continuous shelf, ledge, or bearing on a line with the face of the guard-finger. The sickle-sections D are made to project to the rear over the cavity $b$ and rest on the shelf $d$, as represented at $g$. The object of this is to form a bearing back of the sickle, so that the guides E can hold the points of the sections of the cutter-blades down with less pressure, and consequently with less friction.

It is well known that tangled crops, especially if damp, have a tendency to cling to the cutting apparatus, which has always been a source of great trouble with self-rakers as they have been heretofore constructed. This difficulty can be alleviated to a great extent by the application of the bar H on the top of the finger-bar, for as the grain is laid down by the reel on the platform of the reaper it will tip over the bar H, and will thus be disconnected from the cutters, whereby the raking off is greatly facilitated, and for this reason I sometimes use the bar H, as indicated in the drawings.

There is a slight elevation at $e$ on the fingers, and which may project backward so as to cover the points $f$ of the sickle sections. The object of this elevation is to cause all grass, leaves, or other matters which clog the cutters to pass beyond the points of the sections before they touch the cutters, or, in other words, so that such material shall be acted upon by the cutters before it can possibly get under the points of the cutters or sections. This, too, avoids the necessity of caps over the tops of the sections.

Having thus fully described the nature of my invention, what I claim therein as new, and desire to secure by Letters Patent, is—

Tapering the face of the guard-finger under the sickle-bar and to the rear thereof to a point, and forming a cavity under and behind said point, substantially in the manner and for the purpose described.

JOHN P. MANNY.

Witnesses:
  A. B. STOUGHTON,
  THOS. H. UPPERMAN.